(12) United States Patent
Gollapudi et al.

(10) Patent No.: US 8,139,495 B2
(45) Date of Patent: Mar. 20, 2012

(54) DETERMINING QUALITY OF COMMUNICATION

(75) Inventors: Sreenivas Gollapudi, Cupertino, CA (US); Alan D. Halverson, Sunnyvale, CA (US); Krishnaram G. Kenthapadi, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 498 days.

(21) Appl. No.: 11/854,918

(22) Filed: Sep. 13, 2007

(65) Prior Publication Data

US 2009/0073888 A1 Mar. 19, 2009

(51) Int. Cl.
*H04L 1/00* (2006.01)
*H04J 3/14* (2006.01)
*G01R 31/08* (2006.01)
*G06F 11/00* (2006.01)
*G08C 15/00* (2006.01)

(52) U.S. Cl. ........................ 370/252; 370/432
(58) Field of Classification Search .................... 370/252
See application file for complete search history.

(56) References Cited

U.S. PATENT DOCUMENTS

| | | | |
|---|---|---|---|
| 6,763,226 B1 | 7/2004 | McZeal, Jr. | |
| 7,133,900 B1 | 11/2006 | Szeto | |
| 7,269,643 B2 | 9/2007 | Spaid | |
| 2002/0035605 A1 | 3/2002 | McDowell | |
| 2002/0161838 A1* | 10/2002 | Pickover et al. | 709/204 |
| 2004/0152477 A1 | 8/2004 | Wu | |
| 2005/0021529 A1* | 1/2005 | Hodson et al. | 707/100 |
| 2005/0188423 A1* | 8/2005 | Motsinger et al. | 726/22 |
| 2005/0259656 A1 | 11/2005 | Dollar | |
| 2006/0031292 A1 | 2/2006 | Deshpande | |
| 2006/0168015 A1 | 7/2006 | Fowler | |
| 2006/0253541 A1 | 11/2006 | Kim | |
| 2006/0259623 A1 | 11/2006 | Crawford | |
| 2007/0124386 A1* | 5/2007 | Klassen | 709/206 |
| 2008/0028031 A1* | 1/2008 | Bailey et al. | 709/207 |
| 2008/0125148 A1* | 5/2008 | Zhao et al. | 455/466 |
| 2009/0024747 A1* | 1/2009 | Moses et al. | 709/228 |

FOREIGN PATENT DOCUMENTS

| | | | |
|---|---|---|---|
| KR | 1020020014376 A | | 2/2002 |
| KR | 1020030040263 A | | 5/2003 |
| KR | 2003-0040263 | * | 7/2003 |

OTHER PUBLICATIONS

Anurag Garg, Roberto Battiti and Gianni Costanzi: Dynamic Self-Management of Autonomic systems: The reputation, Quality and credibility (RQC) scheme,Oct. 2004, Department of information and communication technology.*

(Continued)

*Primary Examiner* — Derrick Ferris
*Assistant Examiner* — Maharishi Khirodhar
(74) *Attorney, Agent, or Firm* — Shook, Hardy & Bacon L.L.P.

(57) ABSTRACT

A method, computer-readable medium, and system for providing a quality measurement based on communications within a communication application. Communication attributes that include information associated with a user's communications are obtained. In embodiments, such communication attributes may pertain to communication duration and communication frequency. Upon obtaining communication attributes, a quality measurement may be determined based on the communication attributes. Such a quality measurement provides an indication of the quality of the user's communications. In embodiments, the quality measurement may be stored, communicated to a user, or implemented within a communication application.

12 Claims, 3 Drawing Sheets

OTHER PUBLICATIONS

Anurag Garg, et al. Dynamic self-management of autonomic systems: The reputation quality and credibility (RQC) Scheme, 2004, Trento Italy, Sommarive 14.pp. 1-2.*

The structural Relationships among Weblog service quality (WB-Servqual) user satisifaction, and Loyalty, Su-Yeon Kim et al., 2006, Korea society of industrial information system, entire document.*

Su-Teon Kim et al, "The Structural Relationships among Weblog service quality(wb-SERVQUAL), user satisfaction and loyalty," Journal of Korea Society of Industrial Information Systems, vol. 11, No. 5, Dec. 2006, pp. 67-72.

Cheryl D. Morse et al., "The Structure of an Instant Messenger Network and its Vulnerability to Malicious Codes," Department of Computer Science, the College of William & Mary, Williamsburg, VA., http://www.sigcomm.org/sigcomm2005/poster-125.pdf, 2 pp.

Gao Lisha et al., "Performance Analysis of a P2P-Based VoIP Software," Proceedings of the AICT/ICIW, 2006, IEEE, pp. 1-6.

Anurag Garg et al., Dynamic Self-Management of Autonomic Systems: The Reputation, Quality and Credibility (RQC) Scheme, 2004, Technical Report #DIT-04-082, Department of Information and Communication Technology, University of Trento, Trento, Italy, pp. 1-15.

Abhijit Bose et al., "Proactive Security for Mobile Messaging Networks," WiSe '06, Sep. 29, 2006, Los Angeles, CA., pp. 95-104.

Alexandru Costan, "Distributed Delay Constrained Multicast Algorithms for the MonALISA Framework," Politehnica University of Bucharest, 2004, pp. 1-82.

Reginald Smith, "Instant Messaging as a Scale-Free Network," University of Virginia, May 15, 2006, pp. 1-5.

Jure Leskovec et al., "Worldwide Buzz: Planetary-Scale Views on an Instant-Messaging Network," Microsoft Research Technical Report, MSR-TR-2006-186, Jun. 2007, Redmond, WA., pp. 1-37.

* cited by examiner

DETERMINING QUALITY OF COMMUNICATION

BACKGROUND

Communicating over a computer network has become a significant aspect of the communications experience. Today, a plethora of communication applications exist that allow users to communicate over a network. Such communication applications may include, for example, inquiry applications having a posting forum, e.g., Windows Live™ QnA, Yahoo!® Answers, and Askville™ by Amazon®; sharing applications that enable, among other things, blogging and picture sharing, e.g., Windows Live™ Spaces, Yahoo! 360™, and Myspace.com®; instant message applications, e.g., Windows Live™ Messenger, AIM®, and Google Talk™; and email applications, e.g., Windows Live™ Hotmail®; Yahoo!® Mail, and Gmail™ by Google™.

To enhance the communications experience, determining the degree of closeness or trust between users may be valuable to various facets of communication applications. Such a degree of closeness or trust may indicate the likelihood a user may communicate with another user. Utilizing common statistics, such as the number of communications between a pair of users, to determine the degree of closeness or trust, however, has limitations as quantity is not always an accurate predictor of the degree of closeness or trust between users. Accordingly, assigning a degree of closeness or trust between users in this manner can result in a radically inaccurate likelihood that a user may communicate with another user.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments described below are directed to providing a quality measurement based on communications within a communication application. Communication attributes that include information associated with a user's communications are obtained. In embodiments, such communication attributes may pertain to communication duration and communication frequency. Once communication attributes are obtained, a quality measurement may be determined based on the communication attributes. Such a quality measurement provides an indication of the quality of the user's communications. In embodiments, the quality measurement may be stored, communicated to a user, or implemented within a communication application.

BRIEF DESCRIPTION OF THE SEVERAL VIEWS OF THE DRAWINGS

Embodiments are described in detail below with reference to the attached drawing figures.

DETAILED DESCRIPTION

Figure 1:
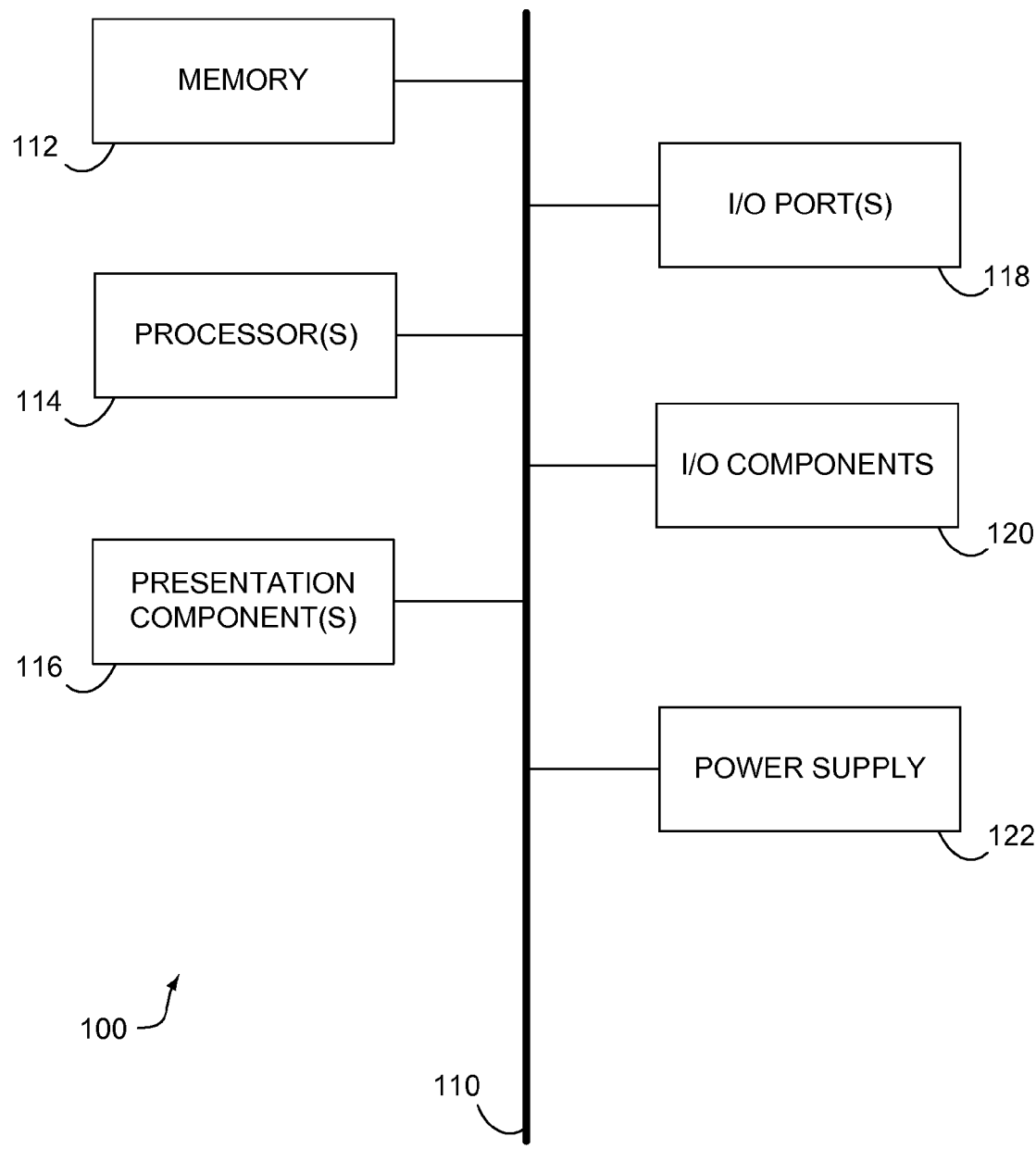
FIG. 1 is a block diagram of a computing-system environment for use in implementing an embodiment.

The subject matter described herein is presented with specificity to meet statutory requirements. However, the claimed subject matter is not limited to the specific embodiments described herein. Rather, it is contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide techniques for providing quality measurements based on communications of users within communication applications. In general, embodiments described herein relate to methods, computer-readable media, and graphical user interfaces for inquiry indication.

Accordingly, in one embodiment, the present invention relates to computer-readable media having computer-executable instructions embodied thereon for providing quality measurements based on communications within an instant messenger application. The method includes obtaining communication attributes, wherein the communication attributes may comprise a duration attribute and a frequency attribute; determining a quality measurement for a communicator based on the communication attributes; and storing the quality measurement.

In another embodiment, the present invention is directed to a computerized system for providing quality measurements based on communications of communicators within a communication application. The computerized system for providing quality measurements may include a communication attributes obtaining component configured to obtain communication frequency attributes and communication duration attributes; a quality measurement determining component configured to determine a quality measure based on the communication frequency attributes and the communication duration attributes; and a quality measurement communicating component configured to communicate the quality measurement.

In yet another embodiment, the present invention is directed to computer-readable media having computer-executable instructions embodied thereon that perform a method for providing quality measurements based on communications within an instant messenger application. Such a method may include obtaining frequency attributes and duration attributes, wherein the frequency attributes comprise information associated with a first user's communication frequency and the duration attributes comprise information associated with the first user's communication duration; calculating a quality measurement for the first user based on the frequency attributes and the duration attributes, wherein the quality measurement comprises an indication of the quality of one or more communications of the first user; and communicating the quality measurement to a second user.

Having briefly described an overview of embodiments of the present invention, an exemplary operating environment suitable for use in implementing embodiments of the present invention is described below.

Referring initially to FIG. 1, an exemplary operating environment for implementing the present invention is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In one embodiment, computing device 100 is a personal computer. But in other embodiments, computing device 100 may be a cell phone, digital phone, personal digital assistant ("PDA"), portable navigation system, or other device capable of executing computer instructions.

Embodiments may be described in the general context of computer code or machine-useable instructions, including computer-executable instructions such as program modules, being executed by a computer or other machine, such as a personal data assistant, portable navigation system, or other handheld device. Generally, program modules including routines, programs, objects, components, data structures, and the like, refer to code that perform particular tasks or implement particular abstract data types. Embodiments may be practiced in a variety of system configurations, including hand-held devices, consumer electronics, general-purpose computers, more specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
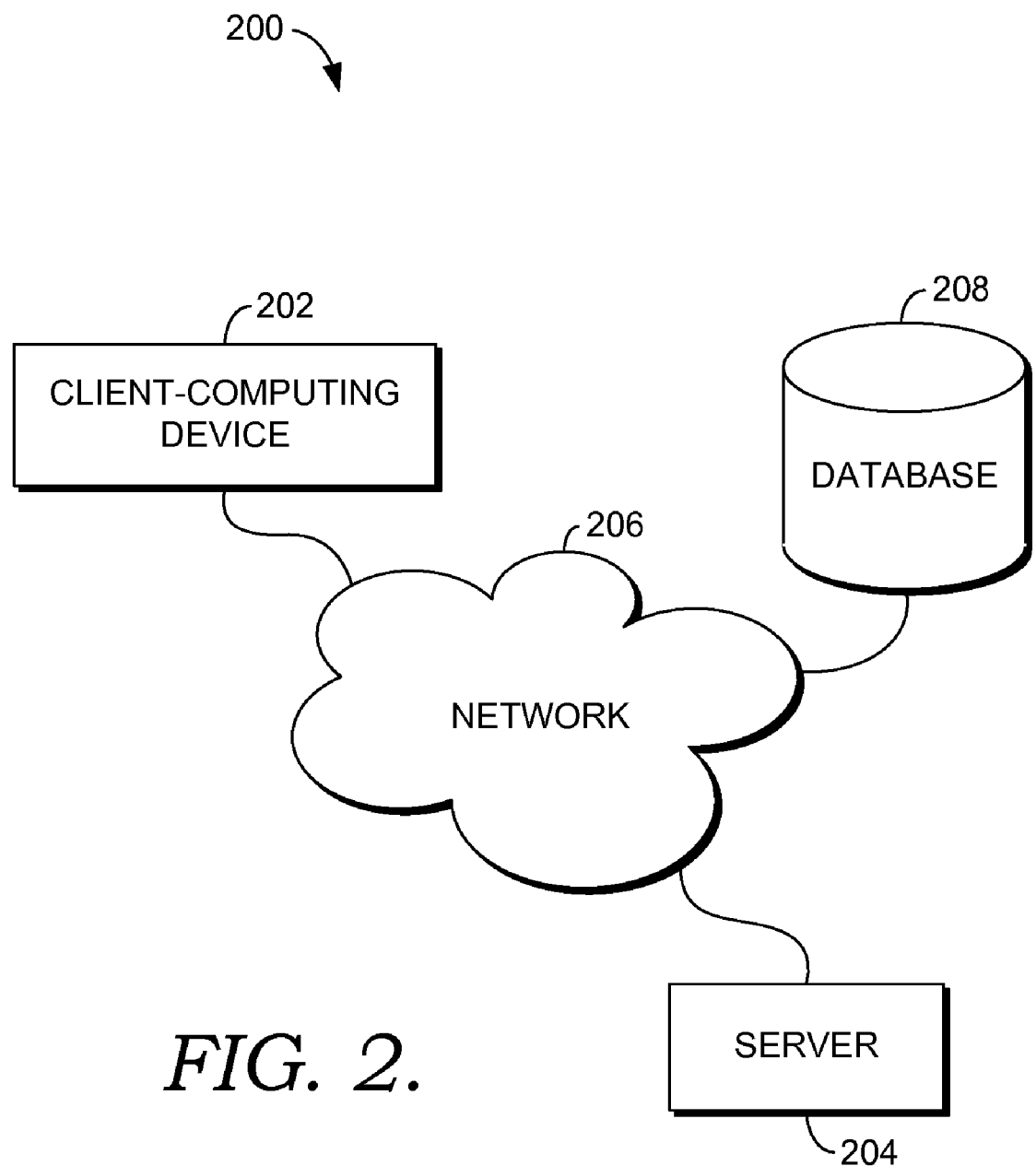
FIG. 2 is a block diagram of a networking environment for use in implementing an embodiment.

FIG. 2 illustrates a block diagram of a networking architecture for use in implementing an embodiment. The networking architecture, generally referenced by numeral 200, comprises client-computing device 202, a server 204, and a database 208 which communicate via a network 206. It will be appreciated by one of ordinary skill in the art that networking architecture 200 is merely an example of one suitable networking environment and is not intended to suggest any limitation as to the scope of use or functionality of embodiments. Neither should networking architecture 200 be interpreted as having any dependency or requirement related to any single component or combination of components illustrated therein.

Client-computing device 202 may be any type of computing device, such as device 100 described above with reference to FIG. 1. By way of example only and not limitation, client-computing device 202 may be a personal computer, desktop computer, laptop computer, handheld device, cellular phone, digital phone, PDA, portable navigation system, or the like. It should be noted that embodiments are not limited to implementations on such computing devices, but may be implemented on any of a variety of different types of computing devices.

Network 206 may include any computer network or combination thereof. Examples of computer networks configurable to operate as network 206 include, without limitation, a wireless network, landline, cable line, fiber-optic line, LAN, WAN, or the like. Network 206 is not limited, however, to connections coupling separate computer units. Rather, network 206 may also comprise subsystems that transfer data between servers or computing devices. For example, network 206 may also include a point-to-point connection, tan internal system Ethernet, a backplane bus, an electrical bus, a neural network, or other internal system. In an embodiment where network 206 comprises a LAN networking environment, components are connected to the LAN through a network interface or adapter. In an embodiment where network 206 comprises a WAN networking environment, components use a modem, or other means for establishing communications over the WAN, to communicate. In embodiments where network 206 comprises a MAN networking environment, components are connected to the MAN using wireless interfaces or optical fiber connections. Such networking environments are commonplace in offices, enterprise-wide computer networks, intranets, and the Internet. It will be appreciated that the network connections shown are exemplary and other means of establishing a communications link between the computers may also be used.

The server 204 may include any type of application server, database server, or file server configurable to perform the methods described herein. In addition, the server 204 may be a dedicated or shared server. One example, without limitation, of a server that is configurable to operate as the server 204 is a structured query language ("SQL") server executing server software such as SQL Server 2005, which was developed by the Microsoft® Corporation headquartered in Redmond, Wash.

Components of server 204 (not shown for clarity) may include, without limitation, a processing unit, internal system memory, and a suitable system bus for coupling various system components, including one or more databases for storing information (e.g., files and metadata associated therewith). Each server typically includes, or has access to, a variety of computer-readable media. By way of example, and not limitation, computer-readable media may include computer-storage media and communication media. In general, communication media enables each server to exchange data via network 206. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that networking architecture 200 is merely exemplary. While the server 204 is illustrated as a single box, one skilled in the art will appreciate that the server 204 is scalable. For example, the server 204 may in actuality include 100 servers in communication. Moreover, the database 208 may be included within the server 204 or client-computing device 202 or as a computer-storage medium. The single unit depictions are meant for clarity, not to limit the scope embodiments in any form.

In operation, a user interacts with the client-computing device 202 via a graphical user interface. In one embodiment, the graphical user interface utilizes a web browser, such as Internet Explorer, to access a communication application executing on server 204. Exemplary communication applications utilizing a web browser include, for example, Windows Live™ QnA, Windows Live™ Spaces, and Windows Live™ Hotmail. In alternative embodiments, the graphical user interface accesses communication applications via an application executing on the client-computing device 202. Such a communication application may include an instant message application such as Windows Live™ Messenger.

In an embodiment, the communication application is a web application configured to support interoperable machine-to-machine communication between the client-computing device 202 and the server 204. In an alternative embodiment, the communication application includes an application programming interface ("API") configurable to access the database 208. Examples of such APIs include, without limitation, active data objects ("ADO"), remote data objects ("RDO"), and the like.

Figure 3:
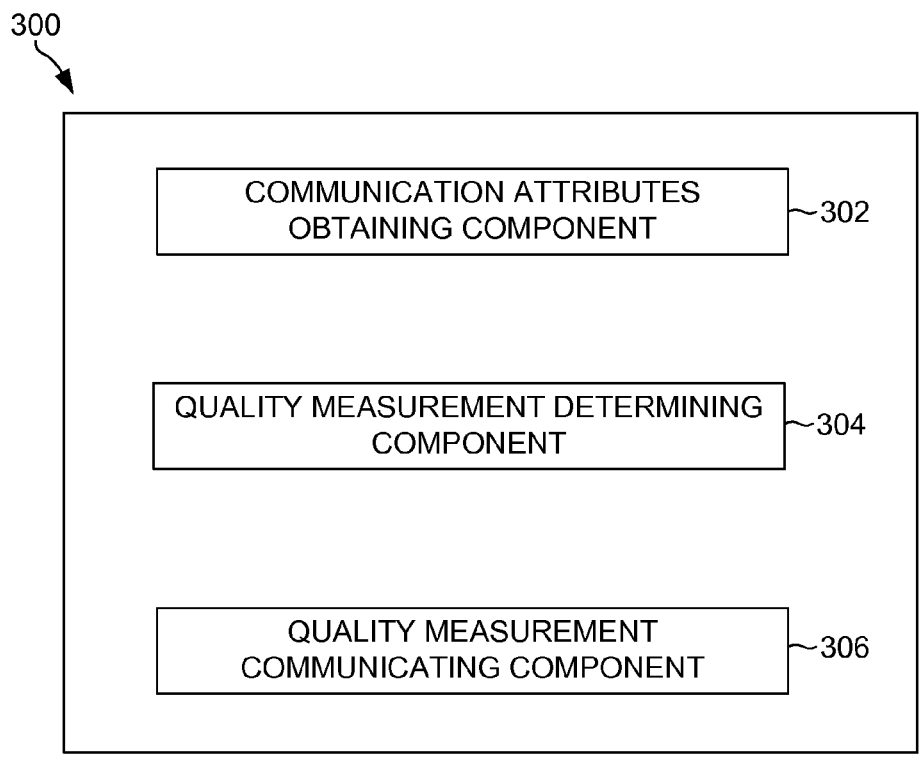
FIG. 3 illustrates an exemplary system for providing a quality measurement, according to an embodiment.

FIG. 3 illustrates an exemplary system for providing quality measurements based on communications of users within communication applications. A user may be a source communicator and/or a destination communicator that utilizes a communication application, such as an inquiry application, a sharing application, an instant message application, or an email application. A source communicator provides a communication. As such, a source communicator may send an instant message, send an email, post a blog entry, or post an inquiry or response. On the other hand, a destination communicator refers to a communicator to whom a communication is directed. For example, a destination communicator may receive an instant message or email provided by a source communicator.

As used herein, the phrase "quality measurement" refers to any measure that provides an indication of the quality of one or more communications of a user. Such a quality measurement may include, for example, a value, text, a symbol, or the like. For example, a source communicator having quality communications with a destination communicator may have a high quality measurement, such as 90%, 0.9, 9 (on a scale of 0 to 10), "good," plus sign (+), four stars (****), "thumbs up," or the like. On the other hand, a source communicator having poor quality communications with destination communicator may have a low quality measurement, such as 10%, 0.1, 1 (on a scale of 0 to 10), "poor," minus sign (−), one star (*), "thumbs down," or the like.

As shown in FIG. 3, an exemplary computer system 300 includes a communication attributes obtaining component 302, a quality measurement determining component 304, and a quality measurement communicating component 306. In some embodiments, one or more of the illustrated components may be implemented as stand-alone applications. In other embodiments, one or more of the illustrated components may be integrated directly into the operating system of a server and/or an end-user device. It will be understood by those of ordinary skill in the art that the components illustrated in FIG. 3 are exemplary in nature and in number and should not be construed as limiting. Any number of components may be employed to achieve the desired functionality within the scope of embodiments hereof.

The communication attributes obtaining component 302 is configured to obtain communication attributes such that a quality measurement may be determined by quality measurement determining component 304. A communication attribute, as used herein, includes information associated with one or more communications and/or users. Such a communication attribute may be, for example, a value, text, a symbol, or the like. One skilled in the art will recognize that a communication attribute may be associated with a single user, e.g., a source communicator or a destination communicator; a pair of users, e.g., a specific source communicator and a specific destination communicator; or a plurality of users, e.g., a group or an entire network of users. In some embodiments, communication attributes may be associated with the volume or quality of text within a communication. Such attributes may further increase the accuracy of quality measurements.

Communication attributes obtaining component 302 may obtain communication attributes by receiving, retrieving, identifying, determining, or generating communication attributes. Such communication attributes may be obtained automatically or based on an indication or request. Communication attributes may be obtained automatically, for example, upon a specific time, a specific time duration, a communication, a frequency of communications, a communication application session, a computer session, any other event, and the like. In such an instance, the communication attributes obtaining component 302 may be configured to monitor time or events such that upon the occurrence of a specific time or event, the communication attributes are automatically obtained. Alternatively, a user or another computer component or module may provide an indication of a desire to view or utilize communication attributes and/or quality measurements. In such an instance, the communication attributes obtaining component 302 may subsequently obtain one or more communication attributes. In some instances, the indication or request to obtain communication attributes may set forth the communication attributes desired. In other instances, the communication attributes obtaining component 302 may obtain a specific set of communication attributes. One skilled in the art will recognize that it is not necessary to simultaneously obtain each communication attribute used to determine a quality measurement. Upon obtaining communication attributes, in one embodiment, the communication attributes may be stored so that the communication attributes may be utilized at a later instance.

In one embodiment, communication attributes obtaining component 302 may obtain one or more communication attributes associated with communication duration, i.e., duration attributes, and/or communication frequency, i.e., frequency attributes. Duration attributes may pertain to the duration of one or more communications associated with one or more users, e.g., source communicators or destination communicators. Such duration attributes may be, among other things, a session duration attribute or a participation duration attribute. A session duration may refer to a length of time one or more users are involved in a session. In one embodiment, a session may refer to a period of time a communication application is open or a user is logged into a communication application. In such an embodiment, a session duration may include participation time as well idle time, i.e., non-participation time. A participation duration may refer to the length of time one or more users participate in a communication, i.e., the time a user spends providing a communication. For example, assuming a user spends three minutes typing an instant message or an email, the participation duration may equal three minutes. In one embodiment, a participation duration may be determined by measuring the amount of time a user strokes keys.

Frequency attributes may pertain to the frequency of communications associated with one or more users, e.g., source communicators, destination communicators, or all communicators within a network. Such frequency attributes may be, among other things, a session frequency attribute or a participation frequency attribute. A session frequency may refer to the number of sessions to which one or more users are involved. A participation frequency may refer to the number of times a user participates in a communication. For example, a frequency attribute associated with a source communicator may include the quantity of outgoing messages from the source communicator to destination communicators within the network. By contrast, a frequency attribute associated with a destination communicator, may include the quantity of incoming communications to the destination communicator from source communicators within the network.

One skilled in the art will appreciate that communication attributes, i.e., complex communication attributes, may also result from a combination of communication attributes, i.e., simple communication attributes. Such complex communication attributes may be determined prior to communication attributes obtaining component 302 obtaining communication attributes. As such, the communication attributes obtaining component 302 may receive or retrieve both simple and complex communication attributes. Alternatively, the communication attributes obtaining component 302 may generate complex communication attributes by performing calculations using simple or complex communication attributes obtained. Any calculation utilizing simple or complex communication attributes may be performed to attain a complex communication attribute.

In one embodiment, a complex communication attribute may be a fraction of simple and/or complex communication attributes. By way of example only, assume a source communicator spends five minutes preparing an instant message to a destination communicator, and the source communicator is involved in the session for ten minutes. In such an instance, a participation duration attribute equals five minutes and a session duration attribute equals ten minutes. To determine the fraction of time the source communicator spends in participating in the session with the destination communicator, the participation duration attribute may be divided by the session duration attribute. As such, a duration fraction attribute equal to one-half may result.

In an alternative embodiment, a complex communication attribute may be an aggregation of simple and/or complex communication attributes. Such an aggregation may be based on a specific time duration, a frequency of communications, a frequency of communication application sessions, a frequency of computer sessions, and the like. For example, assume a source communicator spends five minutes preparing an instant message to a destination communicator in a first session in week one and spends three minutes preparing an instant message to a destination communicator in a second session in week one. A communication attribute may be an aggregation of each participation duration attribute associated with the source communicator during week one. Accordingly, an aggregate duration attribute equal to eight may result.

The quality measurement determining component 304 is configured for determining quality measurements based on communications of users. Quality measurement determining component 304 may utilize communication attributes obtained by communication attributes obtaining component 302 to determine a quality measurement. The quality measurement determining component 304 may determine a quality measurement by utilizing a lookup table, an algorithm, or the like.

A quality measurement may be determined automatically or based on an indication or request. Quality measurements may be obtained automatically, for example, upon a specific time, a specific time duration, a communication, a frequency of communications, a communications application session, a computer session, any other event, e.g., obtaining communication attributes, and the like. In such an instance, the quality measurement determining component 304 may be configured to monitor time or events such that upon the occurrence of a specific time or event, a quality measurement may be automatically determined. Alternatively, a user or another computer component or module may provide an indication of a desire to view or utilize a quality measurement. In such an instance, the quality measurement determining component 304 may subsequently determine a quality measurement. In one embodiment, upon determining a quality measurement, the quality measurement and/or communication attributes may be stored so that the quality measurement and/or communication attributes may be utilized at a later instance.

A quality measurement may be determined based on one or more communication frequency attributes and communication duration attributes. For example, a quality measurement may equal the product of a duration attribute and a frequency attribute, e.g., an inverse frequency attribute. Such a frequency attribute may incorporate the quantity of incoming communications from unique source communicators and/or the quantity of outgoing communications to unique destination communicators. In embodiments, because communications of short duration may not contain information of significance, a quality measurement may be high, i.e. good, in instances where the communication has a long duration. On the other hand, because users that send and receive messages to numerous other users may not make conversations of importance, a quality measurement may be low, i.e., poor, in instances where a sender initiates a lot of communications or a receiver communicates with a substantial amount of other users.

In one embodiment, a quality measurement may capture the quality of communications between a source communicator and a destination communicator from the perspective of the source communicator. Such a quality measurement may be based on the source communicator's communications to the destination communicator within a period of time. The period of time may be any time duration, e.g., a day, a week, a month, a year, and the like, or based on the occurrence of one or more events, e.g., upon the completion of one or more sessions, communications, and the like. In such a case, a quality measurement may be determined utilizing the following algorithm:

$$Q(i, j) = \frac{t_{send_{ij}} / t_{dur_{ij}}}{\sum_j (t_{send_{ij}} / t_{dur_{ij}})} \log\left(\frac{N}{1 + sessions_i}\right) \quad \text{Equation 1}$$

In the above algorithm, $t_{send}$ for a pair of users (i, j) refers to the amount of time source communicator i spent providing a communication to destination communicator j within a period of time. $t_{dur}$ for a pair of users (i, j) refers to the amount of time source communicator i was involved in a session with destination communicator j within a period of time. As such, $t_{send}/t_{dur}$ for a pair of users (i, j) represents the fraction of time source communicator i spent in providing communications, e.g., instant messages, to destination communicator j within a period of time compared to the amount of time source communicator i was involved in sessions with destination communicator j within the same period of time, i.e., send message rate for destination communicator j. If $a_{ij} = t_{send_{ij}}/t_{dur\ ij}$, then $a_{ij}/\Sigma_j a_{ij}$ corresponds to the relative fraction of time that source communicator i communicates with destination communicator j (send message rate for destination communicator j) as compared to the relative fraction of time that source communicator i communicates with all destination communicators within a network (send message rate for all destination communicators). N denotes the total number of sessions with respect to all users in a network within the same period of time. Sessions$_i$ denotes the total number of sessions in which user i participated.

By way of example only, assume John begins three sessions in an instant message application within one week. In a first session lasting 10 minutes (e.g., session duration attribute), John provides an instant message to Jane that takes 5 minutes to prepare (e.g., participation duration attribute). In a second session lasting 10 minutes (e.g., session duration attribute), John only provides an instant message to Mary that takes 5 minutes to prepare (e.g., participation duration attribute). In a third session lasting 20 minutes (e.g., session duration attribute), John provides five instant messages to Jane each of which takes 2 minutes to prepare for a total of 10 minutes preparing messages to Jane (e.g., participation duration attribute). As such, in determining a quality measurement for John based on communications with Jane within one week, $t_{send}$ equals 15 minutes, e.g., aggregate participation duration attribute, (5 minutes for preparing message in first session plus 10 minutes for preparing 5 messages in third session) and $t_{dur}$ equals 30 minutes, e.g., aggregate session duration attribute (10 minutes for the first session duration plus 20 minutes for the third session duration). Accordingly, the fraction of time source communicator John spent in providing messages to destination communicator Jane within a period of one week compared to the amount of time source communicator John was involved in sessions with destination communicator Jane within the same week equals 0.5, e.g., fraction duration attribute.

The fraction of time John spent in providing messages to destination communicator Mary compared to the amount of time source communicator John was involved in a session with destination communicator Mary within the same week equals 0.5, e.g., fraction duration attribute (5 minutes for preparing message in second session divided by 10 minutes for the second session duration). Accordingly, the total fraction of time that source communicator John spent in providing messages to all destination communicators (i.e., Jane and Mary) within a period of one week compared to the amount of time source communicator John was involved in sessions with all destination communicators within the same week equals 1 (0.5 for the fraction duration attribute with respect to Jane plus 0.5 for the fraction duration attribute with respect to Mary). As such, the relative fraction of time that source communicator John communicates with destination communicator Jane as compared to the relative fraction of time that source communicator John communicates with all destination communicators (Jane and Mary) equals 0.5 (0.5/1).

The total number of sessions with respect to all users in a network within the same period of time, N, for example, equals 500. The total number of sessions, sessions$_i$, in which source communicator John participated equals 3. Accordingly, based on the algorithm, the quality measurement for John based on communications with Jane within one week equals approximately 2.1 (i.e., 1×log(500/4)).

In another embodiment, a quality measurement may capture the quality of communications between a source communicator and a destination communicator from the perspective of the destination communicator. Such a quality measurement may be based on the source communicator's communications to the destination communicator within a period of time. In such a case, a quality measurement may be determined utilizing $t_{rec}$ rather than $t_{send}$ in Equation 1. $t_{rec}$ for a pair of users (i, j) refers to the amount of time source communicator i spent receiving a communication provided by destination communicator j within a period of time.

Because the quality of a communication from a prolific user is typically considered inferior compared to a user who sends messages intermittently, the logarithmic term in the above-mentioned algorithms discounts the quality of communications of a prolific user. For example, a spammer with a large number of communications within a time period has a high value for sessions$_i$ and, therefore, a low, i.e., poor, quality measurement.

Quality measurements may be updated such that the quality measurement is based on recent communications. Quality measurements may be updated by determining the quality measurement utilizing communication attributes based on recent communications. In one instance, to update a quality measurement, the quality measurement determining component 304 may utilize communication attributes based on recent communications in addition to the communication attributes used in a previous quality measurement. Alternatively, the quality measurement determining component 304 may utilize only the communication attributes based on recent communications, e.g., communications within the previous week, to provide a new updated quality measurement.

Because the quality of communication may degrade or improve with time, in one embodiment, a quality measurement algorithm, such as quality measurement algorithm previously set forth as Equation 1, may be extended to support this possible temporal shift in quality. In such an embodiment, the quality measurement determining component 304 may be configured to determine a quality measurement based on a temporal shift. In such a case, the quality measurement based on a temporal shift may be determined utilizing the following algorithm:

$$Q(i,j)=Q^t(i,j)+\delta Q^{t-1}(i,j)+\delta^2 Q^{t-2}(i,j)+\ldots+\delta^n Q^{t-n}(i,j) \quad \text{Equation 2}$$

In the above algorithm, $Q^t(i, j)$ refers to a quality measurement for a pair of users $(i, j)$ with respect to a specific time period, e.g., within week one. $\delta$ is a temporal coefficient that is greater than zero. Such a temporal coefficient may scale up or down the contribution of the quality of one or more communications from a previous time period. In an instance where the temporal coefficient equals zero, no weight is given to communications in a previous time period. In an instance where the temporal coefficient equals one, equal weight is given to communications in each previous time period. Where the temporal coefficient is between zero and one, the more distant communications are discounted and importance is given to the more recent communications. Where the temporal coefficient is greater than one, the more recent communications are discounted and importance is given to the more historical communications. Accordingly, Equation 2 may combine successive time periods, e.g., weeks, of quality measurements to provide a quality measurement that represents a current view of communication quality between a pair of users. One skilled in the art will recognize that a similar equation may be utilized with respect to a global quality measurement for a user.

In some embodiments, rather than or in addition to a quality measurement based on a pair of users, such as Equations 1 and 2, the quality measurement determining component may determine a global quality measurement for a user. A global quality measurement for a user, as used herein, refers to a quality measurement based on communications with all users in a network. To determine a global quality measurement for a user, the quality measurement determining component 304 may aggregate or average quality measurements associated with a user. For example, assume a user i has a quality measurement of 0.25 based on communications with user j and a quality measurement of 0.75 based on communications with user k. In such a case, a global quality measurement for user i may be calculated to be 0.5.

In some embodiments, the quality measurement determining component 304 may be configured to convert a quality measurement into a second, more meaningful, quality measurement. That is, the quality measurement determining component 304 may determine a quality measurement, such as 0, and convert the quality measurement into a more meaningful measurement, such as "poor communicator," that a user may value and understand.

The quality measurement communicating component 306 is configured to communicate quality measurements. In one embodiment, the quality measurement communicating component 306 may communicate quality measurements to users. The quality measurements may be communicated to users automatically or upon an indication or request from a user. A quality measurement associated with a first user may provide a second user with information about the first user. For example, assume John is associated with a high quality measurement, such as a "thumbs up," indicating that John has quality communications. Further assume Jane views the quality measurement associated with John. Based on the quality measurement associated with John, Jane may make a better informed decision on whether to accept a communication request from John, whether to trust a response provided by John, and the like. Such a quality measurement may provide an indication of whether John is a spammer or whether John has had quality communications in the past with respect to either Jane or all users in the network.

Alternatively or in addition to, the quality measurement communicating component 306 may communicate quality measurements to a module or component within a computer application that may implement the quality measurement. For example, contacts listed in an address book or buddy list may be positioned in order of the respective quality measurements. In such a case, contacts having higher quality measurements may be placed at the top of a vertical listing to represent the likelihood a user may communicate with such contact. One skilled in the art will recognize that system 300 may be configured to implement quality measurements within various facets of communication applications.

Figure 4:
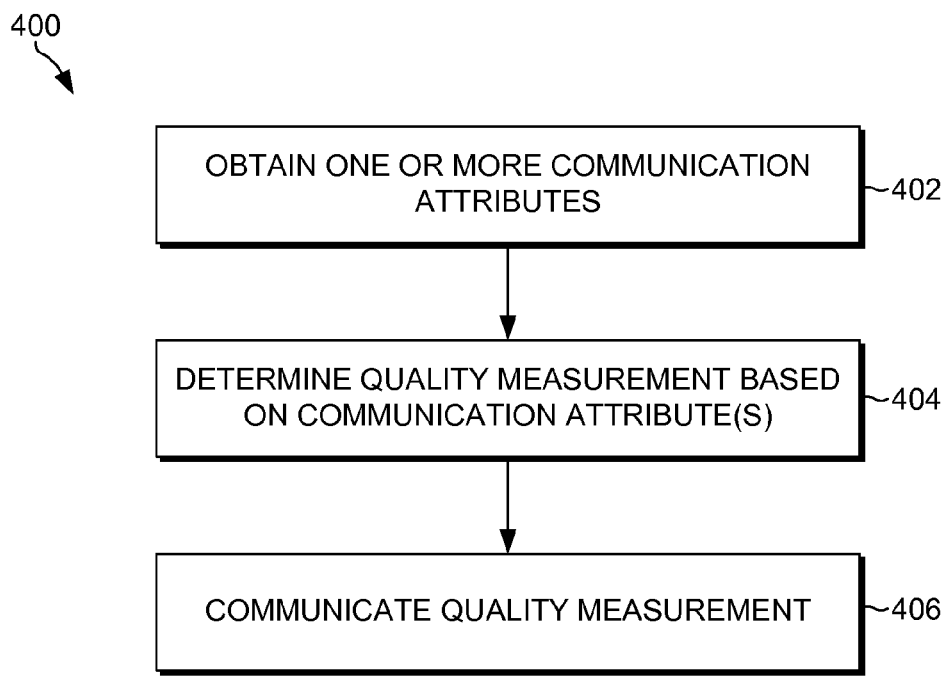
FIG. 4 is a flow diagram illustrating an exemplary method for providing a quality measurement, according to an embodiment.

Referring now to FIG. 4, a flow diagram is shown illustrating a method 400 for providing a quality measurement, in accordance with an embodiment of the present invention. Initially, as indicated at block 402, one or more communication attributes are obtained. In one embodiment, such communication attributes may be obtained by receiving, identifying, determining, or generating the communication attributes. At block 404, a quality measurement is determined based on one or more of the communication attributes obtained at block 402. The quality measurement is communicated, as indicated at block 406. The quality measurement may be communicated to a user or to a module or component within a computer application that may implement the quality measurement.

The present invention has been described herein in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain ends and objects set forth above, together with other advantages which are obvious and inherent to the system and method. It will be understood that certain features and subcombinations are of utility and may be employed without reference to other features and subcombinations. This is contemplated by and is within the scope of the claims.

The invention claimed is:

1. A method for providing quality measurements based on communications within an instant messenger application, the method comprising:

obtaining at least one frequency attribute comprising a frequency of a first user's communication with a second user within the instant messenger application that occurs within a predetermined time period;

obtaining an aggregate session duration attribute comprising a total amount of time the first user is involved in one or more instant message sessions with the second user that occur within the predetermined time period and an aggregate participating duration attribute comprising a total amount of time the first user prepares one or more instant messages intended for the second user within the one or more instant message sessions that occur within the predetermined time period;

utilizing the aggregate session duration attribute and the aggregate participating duration attribute to determine a send message rate in association with one or more communications from the first user to the second user, the send message rate comprising a fraction of the total amount of time the first user prepares the one or more instant messages compared to the total amount of time the first user is involved in the one or more instant message sessions with the second user;

determining, via a computing device, a relative send message rate using the send message rate, wherein the relative send message rate comprises a relative fraction of the send message rate in association with the one or more communications from the first user to the second user compared to a global send message rate in association with one or more communications from the first user to any users of the instant messenger application;

calculating a quality measurement for the first user based on the at least one frequency attribute and the relative send message rate, the quality measurement providing an indication of the quality of one or more communications of the first user within the instant messenger application; and communicating the quality measurement to the second user.

2. The method of claim 1, wherein the quality measurement comprises a value, text, a symbol, or a combination thereof.

3. The method of claim 1, wherein the first user comprises a source communicator.

4. The method of claim 1, wherein the first user comprises a destination communicator.

5. The method of claim 1, wherein the at least one frequency attribute comprises at least one session frequency attribute, at least one participation frequency attribute, or a combination thereof.

6. The method of claim 1 further comprising converting the quality measurement to a second quality measurement, wherein the second quality measurement provides a meaningful indication of the quality of one or more communications of the first user.

7. One or more computer-readable storage media, not being a signal per se, having computer-executable instructions embodied thereon that, when executed, perform a method for providing quality measurements based on communications within an instant messenger application, the method comprising:

obtaining at least one frequency attribute comprising a frequency of a first user's communication with a second user within the instant messenger application that occurs within a predetermined time period;

obtaining an aggregate session duration attribute comprising a total amount of time the first user is involved in one or more instant message sessions with the second user that occur within the predetermined time period and an aggregate participating duration attribute comprising a total amount of time the first user prepares one or more instant messages intended for the second user within the one or more instant message sessions that occur within the predetermined time period;

utilizing the aggregate session duration attribute and the aggregate participating duration attribute to determine a send message rate in association with one or more communications from the first user to the second user, the send message rate comprising a fraction of the total amount of time the first user prepares the one or more instant messages compared to the total amount of time the first user is involved in the one or more instant message sessions with the second user;

determining a relative send message rate using the send message rate, wherein the relative send message rate comprises a relative fraction of the send message rate in association with the one or more communications from the first user to the second user compared to a global send message rate in association with one or more communications from the first user to any users of the instant messenger application;

calculating a quality measurement for the first user based on the at least one frequency attribute and the relative send message rate, the quality measurement providing an indication of the quality of one or more communications of the first user within the instant messenger application; and communicating the quality measurement to the second user.

8. The one or more computer-readable storage media of claim 7 further comprising converting the quality measurement to a second quality measurement, wherein the second quality measurement provides a meaningful indication of the quality of one or more communications of the first user.

9. The one or more computer-readable storage media of claim 7, wherein the quality measurement accounts for more distant communications being given less weight and more recent communications being given more weight.

10. The one or more computer-readable storage media of claim 7, wherein the total amount of time the first user prepares the one or more instant messages intended for the second user is determined by measuring the amount of time the first user strokes keys.

11. The one or more computer-readable storage media of claim 7, wherein the quality measurement is greater when the send message rate is high and the at least one frequency attribute is low.

12. The one or more computer-readable storage media of claim 7, wherein the quality measurement comprises a global quality measurement, wherein the global quality measurement is based on the one or more communications of the first user with a plurality of communicators.

* * * * *